(12) United States Patent
Sugiyama

(10) Patent No.: US 11,294,208 B2
(45) Date of Patent: Apr. 5, 2022

(54) OPTICAL DEVICE

(71) Applicant: Fujitsu Optical Components Limited, Kawasaki (JP)

(72) Inventor: Masaki Sugiyama, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 16/907,723

(22) Filed: Jun. 22, 2020

(65) Prior Publication Data

US 2021/0033896 A1 Feb. 4, 2021

(30) Foreign Application Priority Data

Jul. 30, 2019 (JP) .............................. JP2019-139838

(51) Int. Cl.
*G02F 1/065* (2006.01)
*H04B 10/516* (2013.01)
*G02F 1/025* (2006.01)

(52) U.S. Cl.
CPC .............. *G02F 1/065* (2013.01); *G02F 1/025* (2013.01); *H04B 10/516* (2013.01); *G02F 2202/022* (2013.01)

(58) Field of Classification Search
CPC .... G02F 1/065; G02F 1/025; G02F 2202/022; H04B 10/516
See application file for complete search history.

(56) References Cited

U.S. PATENT DOCUMENTS

| 4,340,975 A * | 7/1982 | Onishi ................... H03D 7/161 |
| | | 348/731 |
| 5,606,737 A * | 2/1997 | Suzuki ................. H03B 5/1852 |
| | | 455/319 |
| 6,101,295 A * | 8/2000 | Mineo ....................... H01P 5/02 |
| | | 385/1 |
| 6,437,899 B1 * | 8/2002 | Noda .................... G02F 1/0121 |
| | | 257/728 |
| 7,227,246 B2 * | 6/2007 | Mahowald .............. H01S 5/042 |
| | | 257/138 |
| 7,283,689 B1 * | 10/2007 | Block .................... B82Y 20/00 |
| | | 385/2 |

(Continued)

FOREIGN PATENT DOCUMENTS

JP 2001-209017 3/2001

OTHER PUBLICATIONS

Qui et al., Thin TiO2 core and electro-optic polymer cladding waveguide modulators, Applied Physics Letters 102, 233504 (2013) (Year: 2013).*

(Continued)

*Primary Examiner* — Peter Radkowski
(74) *Attorney, Agent, or Firm* — Staas & Halsey LLP

(57) ABSTRACT

An optical transmission device includes a substrate, a waveguide, a signal wire, a ground wire, and a first stub wire. The waveguide is provided on the substrate and transmits an optical signal. The signal wire and the ground wire are disposed on the substrate along the waveguide and include, at end portions, bonding portions electrically connected to an external substrate by wires. The first stub wires are connected to the end portions of the ground wires. The distance between the signal wire and the first stub wire is shorter than the distance between the signal wire and the ground wire.

10 Claims, 12 Drawing Sheets

(56) References Cited

U.S. PATENT DOCUMENTS

| | | | |
|---|---|---|---|
| 7,573,126 B2* | 8/2009 | Mahowald | H01S 5/042 257/138 |
| 8,655,116 B2* | 2/2014 | Ishimura | G02F 1/2255 385/2 |
| 9,423,667 B2* | 8/2016 | Matsumoto | G02F 1/2257 |
| 9,621,279 B2* | 4/2017 | Okamoto | H03F 3/08 |
| 2005/0093790 A1* | 5/2005 | Mahowald | H01S 5/042 345/82 |
| 2006/0115197 A1* | 6/2006 | Choi | G02F 1/0356 385/2 |
| 2007/0278636 A1* | 12/2007 | Mahowald | H01S 5/042 257/678 |
| 2009/0159326 A1* | 6/2009 | Mellitz | H05K 1/0251 174/266 |
| 2011/0170820 A1 | 7/2011 | Prather et al. | |
| 2011/0293216 A1* | 12/2011 | Lipson | G02B 6/13 385/14 |
| 2012/0087614 A1* | 4/2012 | Ishimura | G02F 1/2255 385/2 |
| 2015/0015453 A1* | 1/2015 | Puzella | H05K 1/0206 343/853 |
| 2015/0378238 A1* | 12/2015 | Matsumoto | G02F 1/2255 385/2 |
| 2016/0056900 A1* | 2/2016 | Okamoto | H04B 10/693 398/38 |
| 2018/0284559 A1* | 10/2018 | Fujikata | G02F 1/025 |

OTHER PUBLICATIONS

Qui et al., Ultra-thin silicon/electro-optic polymer hybrid waveguide modulators, Applied Physics Letters 107, 123302 (2015) (Year: 2015).*

Baudzus et al., Low Loss Electro-Optic Polymer Based Fast Adaptive Phase Shifters Realized in Silicon Nitride and OxynitrideWaveguide Technology, Photonics 2016, 3, 49; doi:10.3390/photonics3030049 (Year: 2016).*

Inoue et al., Hybrid Ultra Thin Silicon and Electro-Optic Polymer Waveguide Modulator, P-84, 22nd Microoptics Conference (MOC2017), Tokyo, Japan, Nov. 19-22, 2017 (Year: 2017).*

Himmelhuber et al., A Silicon-Polymer Hybrid Modulator—Design, Simulation and Proof of Principle, Journal of Lightwave Technology, vol. 31, No. 24, Dec. 15, 2013 (Year: 2013).*

Kawanishi et al., LiNbO3 resonant-type optical modulator with double-stub structure, Electronics Letters Sep. 27, 2001 vol. 37 No. 20 (Year: 2001).*

Vivien et al., Comparison between strip and rib SOI microwaveguides for intra-chip light distribution, Optical Materials 27 (2005) 756-762 (Year: 2005).*

* cited by examiner

OPTICAL DEVICE

CROSS-REFERENCE TO RELATED APPLICATION

This application is based upon and claims the benefit of priority of the prior Japanese Patent Application No. 2019-139838, filed on Jul. 30, 2019, the entire contents of which are incorporated herein by reference.

FIELD

The embodiment described herein is related to an optical device.

BACKGROUND

A reduction in the size of an optical device such as an optical modulator has been advanced. A silicon waveguide has a strong optical confinement effect. A bend radius of the waveguide can be reduced. Therefore, the size of an optical modulator can be reduced compared with an LN modulator and a compound semiconductor modulator in the past. In the optical modulator in which the silicon waveguide is used, a PN junction portion is provided in the silicon waveguide. By applying a voltage to the PN junction portion via a metal wire, an electric field is generated in the PN junction portion to change a refractive index of the silicon waveguide. When the refractive index of the silicon waveguide changes, the speed of an optical signal propagated in the silicon waveguide changes and the phase of the optical signal output from the silicon waveguide changes. In the optical modulator in which the silicon waveguide is used, the optical signal can be modulated using this nature.

Another external device such as a driver circuit for inputting an electric signal is connected to the optical device such as the optical modulator by, for example, a metal wire. The metal wire connects a pad provided in a signal wire or a ground wire of the optical device such as the optical modulator and a pad provided in a signal wire or a ground wire of the external device such as the driver circuit.

[Patent Literature 1] Japanese Laid-open Patent Publication No. 2001-209017

Incidentally, when a reduction in the size of the optical device advances, it is possible to form a plurality of optical devices on a substrate of silicon or the like. The plurality of optical devices formed on the substrate is separated into individual devices by dicing. In recent years, a dicing technique using a laser beam has been used because of advantages that, for example, damage to a device is low and dust caused by dicing is little. In the dicing using the laser beam, since it is difficult to dice metal through which the laser beam is not transmitted, a metal wire and the like are disposed in a region separated from a dicing line by a predetermined distance or more. For example, a pad, to which a metal wire is bonded, is disposed in a position separated from an end portion of an optical device by a predetermined distance or more.

When the distance between the pad and the end portion of the optical device is long, the distance between the pad and a pad of an external device such as a driver circuit is long and a metal wire connecting the pads is also long. When the metal wire is long, the characteristic impedance of a wire increases. Reflection of an electric signal due to impedance mismatch occurs. When the reflection of the electric signal occurs, the intensity of a signal having a part of frequencies corresponding to a reflected wave in a signal band fluctuates and the quality of the signal is deteriorated.

SUMMARY

According to an aspect of an embodiment, an optical transmission device includes a substrate, a waveguide, a signal wire, a ground wire, and a first stub silicon wire. The waveguide is provided on the substrate and transmits an optical signal. The signal wire and the ground wire are disposed on the substrate along the waveguide and include, at end portions, bonding portions pads electrically connected to an external substrate by wires. The first stub silicon wires are connected to the end portions of the ground wires. The distance between the signal wire and the silicon first stub wire is shorter than the distance between the signal wire and the ground wire.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Preferred embodiments of the present invention will be explained with reference to accompanying drawings. Note that the embodiment explained below does not limit the disclosed technique.

Configuration of an Optical Transceiver 10

Figure 1:
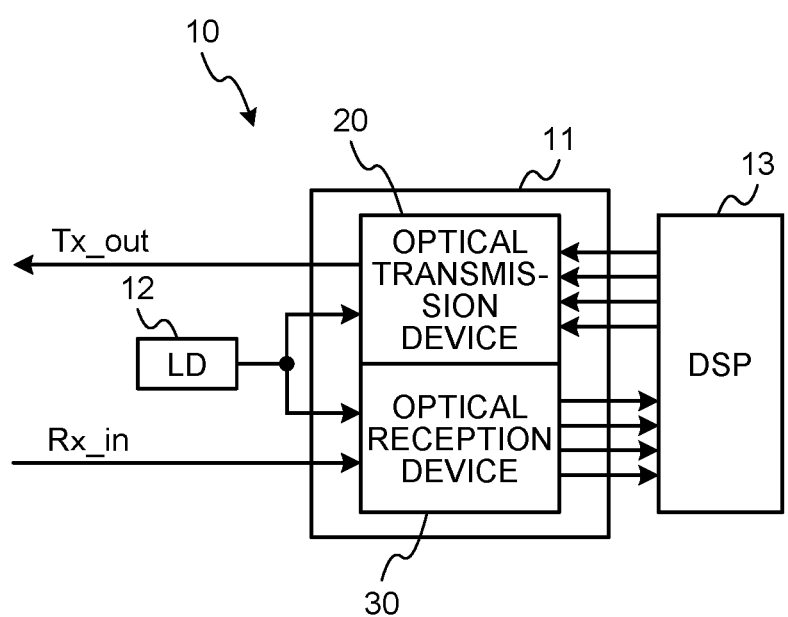
FIG. 1 is a diagram illustrating an example of an optical transceiver.

FIG. 1 is a diagram illustrating an example of an optical transceiver 10. The optical transceiver 10 in this embodiment includes an optical transmission and reception unit 11, a laser diode (LD) 12, and a digital signal processor (DSP) 13. The optical transmission and reception unit 11 includes an optical transmission device 20 and an optical reception device 30. The optical transmission device 20 and the optical reception device 30 are an example of an optical device.

The optical transmission device 20 modulates, based on a transmission signal output from the DSP 13, light supplied from the LD 12. The optical transmission device 20 outputs an optical signal (Tx_out) modulated according to the transmission signal. The optical reception device 30 receives an optical signal (Rx_in). The received optical signal is polarized and separated, modulated using the light supplied from the LD 12, converted into an electric signal, and output to the DSP 13.

Configuration of the Optical Transmission Device 20

Figure 2:
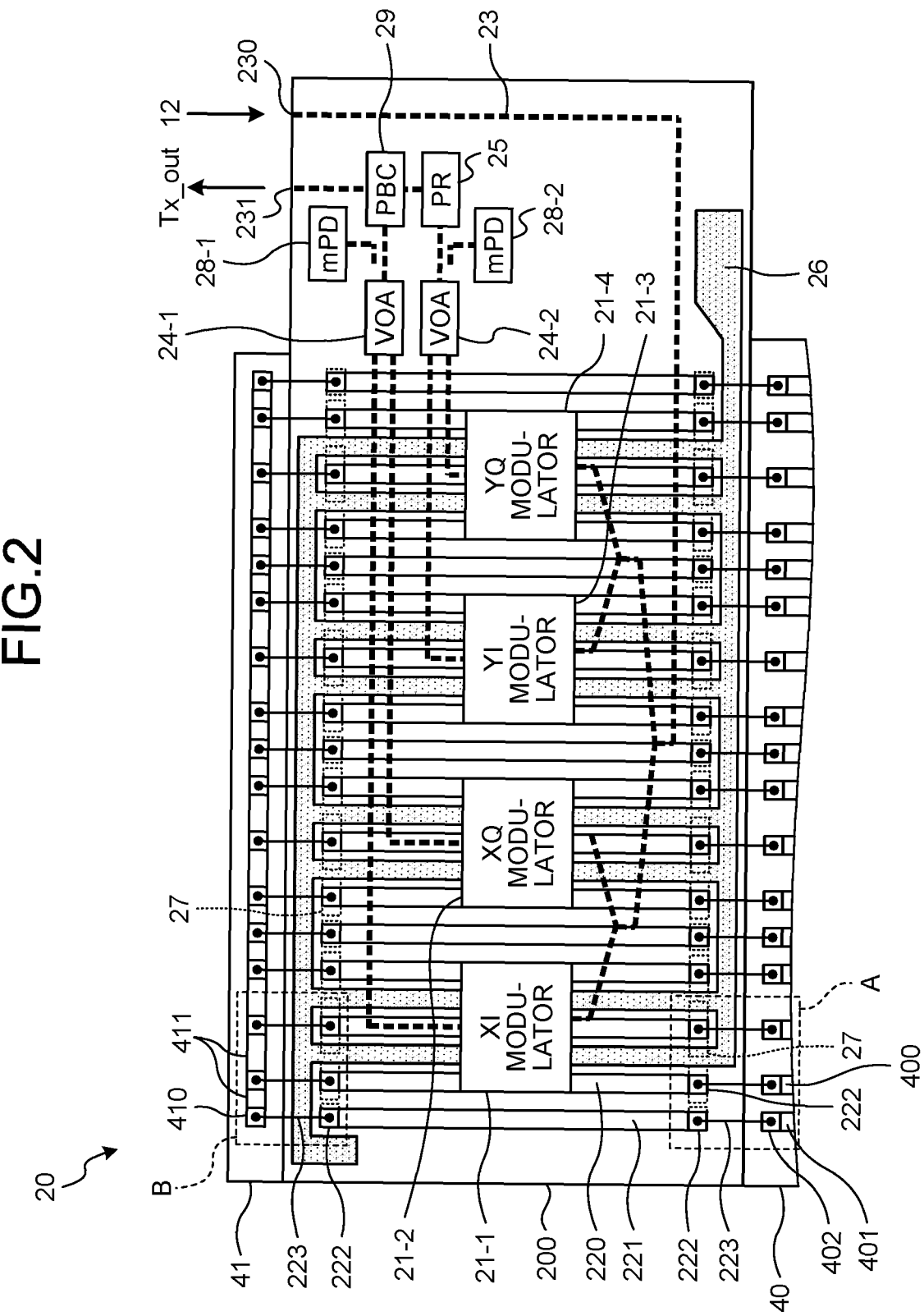
FIG. 2 is a diagram illustrating an example of an optical transmission device.

FIG. 2 is a diagram illustrating an example of the optical transmission device 20. The optical transmission device 20 includes a device main body 200. An external substrate 40 and a terminal substrate 41 are connected to the device main body 200 via wires 223. For example, a driver circuit that supplies an electric signal based on a transmission signal to the device main body 200 is mounted on the external substrate 40. A terminal resistor connected to a wire provided in the device main body 200 is mounted on the terminal substrate 41.

The device main body 200 includes an XI modulator 21-1, an XQ modulator 21-2, a YI modulator 21-3, and a YQ modulator 21-4. The optical transmission device 20 includes a VOA 24-1, a VOA 24-2, a PR 25, an electro optic (EO) polymer 26, an mPD 28-1, an mPD 28-2, and a PBC 29. VOA is an abbreviation of Variable Optical Attenuator, PR is an abbreviation of a Polarization Rotator, mPD is an abbreviation of monitor Photo Diode, and PBC is an abbreviation of Polarization Beam Combiner.

Note that, in the following explanation, when the XI modulator 21-1, the XQ modulator 21-2, the YI modulator 21-3, and the YQ modulator 21-4 are collectively referred to without being distinguished from one another, the XI modulator 21-1, the XQ modulator 21-2, the YI modulator 21-3, and the YQ modulator 21-4 are described as modulators 21. In the following explanation, when the VOA 24-1 and the VOA 24-2 are collectively referred to without being distinguished from each other, the VOA 24-1 and the VOA 24-2 are described as VOAs 24 and, when the mPD 28-1 and the mPD 28-2 are collectively referred to without being distinguished from each other, the mPD 28-1 and the mPD 28-2 are described as mPDs 28. In FIG. 2, from the viewpoint of clearness of the drawing, hatching is applied to the EO polymer 26.

A waveguide 23 that propagates an optical signal is formed on the device main body 200. Light output from the LD 12 is input from an input end 230 of the waveguide 23 and input to the respective modulators 21 via the waveguide 23. In the respective modulators 21, signal wires 220 for transmitting a transmission signal, which is an electric signal, ground wires 221 connected to the ground, and EO polymers 26 disposed between the signal wires 220 and the ground wires 221 are disposed along the waveguide 23. In the respective modulators 21, a refractive index of the EO polymers 26 disposed between the signal wires 220 and the ground wires 221 changes according to a voltage applied between the signal wires 220 and the ground wires 221. Consequently, the phase of light propagated in the waveguide 23 disposed along the EO polymers 26 changes. The light can be modulated according to the transmission signal by changing, according to the transmission signal, the voltage applied to the signal wires 220. In the respective modulators 21, the transmission signal is supplied to the signal wires 220 on an input end side of the optical signal.

The intensity of the optical signal modulated by the respective modulators 21 is adjusted by the VOAs 24. The optical signal output from the VOAs 24 is received by the mPDs 28. The VOAs 24 adjust the intensity of the optical signal according to a light reception current of the mPDs 28.

The PR 25 rotates a polarization plane of the optical signal, the intensity of which is adjusted by the VOA 24-2. The optical signal, the intensity of which is adjusted by the VOA 24-1, is combined with the optical signal, the polarization plane of which is rotated by the PBC 29 and output from an output end 231 of the waveguide 23 as an optical signal (Tx_out).

Pads 222, to which the wires 223 are bonded, are provided at both ends of the signal wires 220 and the ground wires 221. The pads 222 are an example of a bonding portion. Silicon wires 27 are connected to the respective pads 222. The pads 222 are disposed on the surface of the device main body 200. The silicon wires 27 are disposed on the inside of the device main body 200. The pads 222 and the silicon wires 27 are respectively connected via vias. The EO polymers 26 are disposed between ends portions of the signal wires 220, where the pads 222 are formed, and an end portion of the device main body 200 and between end portions of the ground wires 221, where the pads 222 are formed, and the end portion of the device main body 200.

In this embodiment, the silicon wires 27 are silicon added with n-type impurities such as phosphorus at high concentration. Note that the silicon wires 27 may be silicon added with p-type impurities such as boron at high concentration. The silicon wires 27 connected to the pads 222 of the ground wires 221 are an example of a first stub wire. The silicon wires 27 connected to the pads 222 of the signal wires 220 are an example of a second stub wire.

Signal wires 400, through which a transmission signal is transmitted, and ground wires 401 connected to the ground are provided on the external substrate 40. Pads 402, to which the wires 223 are bonded, are provided at end portions of the signal wires 400 and the ground wires 401. Pads 410, to which the wires 223 are bonded, are provided on the terminal substrate 41. Terminal resistors 411 (for example, 50Ω) are connected between the pads 410 connected to the signal wires 220 via the wires 223 and the pads 410 connected to the ground wires 221 via the wires 223.

Structure of the Modulator 21

Figure 3:
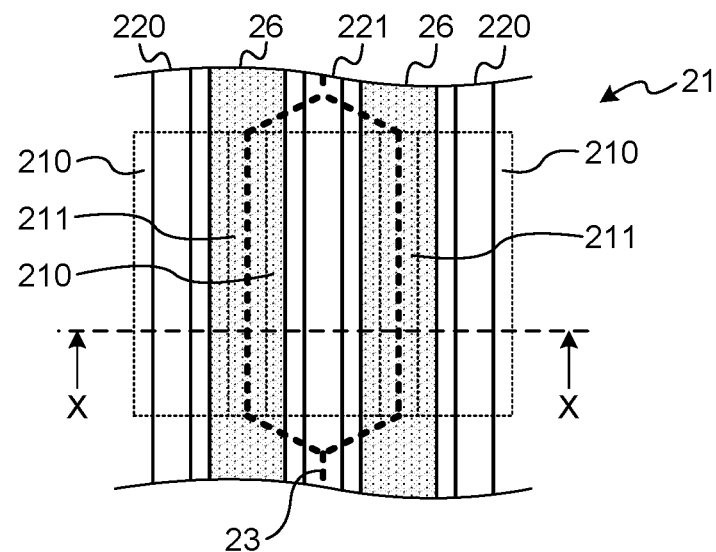
FIG. 3 is a diagram illustrating an example of the structure of a modulator.
Figure 4:
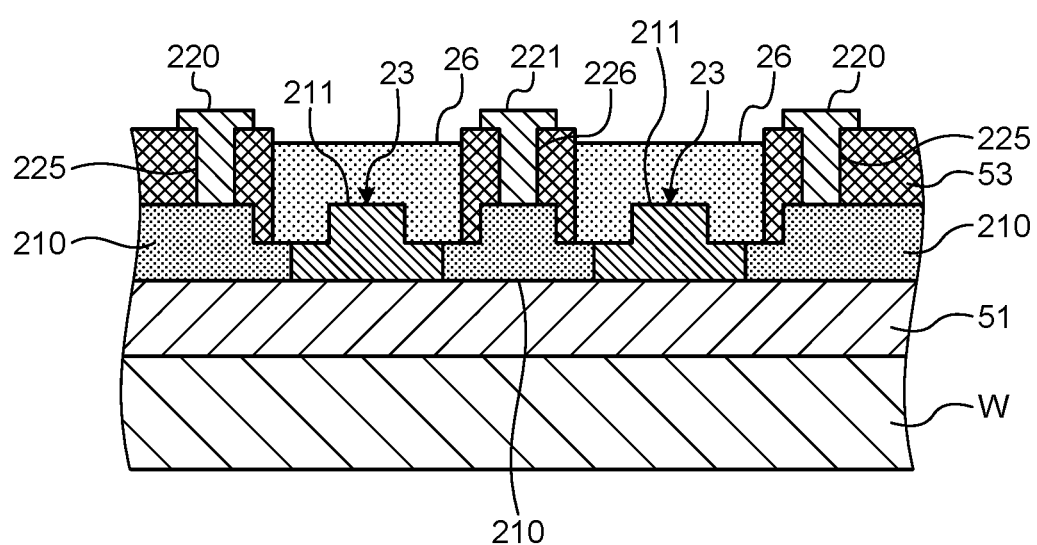
FIG. 4 is an X-X sectional view illustrating the example of the structure of the modulator.

FIG. 3 is a diagram illustrating an example of the structure of the modulator 21. FIG. 4 is an X-X sectional view illustrating the example of the structure of the modulator 21. An X-X section of FIG. 3 corresponds to FIG. 4. The modulator 21 includes the signal wires 220, the ground wires 221, the EO polymers 26, semiconductor layers 210, and silicon layers 211. The signal wires 220, the ground wires 221, the EO polymers 26, the semiconductor layers 210, and the silicon layers 211 are disposed along the waveguide 23. The modulator 21 in this embodiment is an optical modulator in which the EO polymers 26 are used. Note that, in FIG. 3, from the viewpoint of clearness of the drawing, hatching is applied to the EO polymers 26.

For example, as illustrated in FIG. 4, the semiconductor layers 210 and the silicon layers 211 are formed on a buried oxide (BOX) layer 51 stacked on a substrate W of single crystal silicon or the like. Insulating layers 53 of oxide silicon or the like is stacked on the semiconductor layers 210 and the silicon layers 211. The signal wires 220 and the ground wires 221 are formed on the insulating layers 53.

In this embodiment, the semiconductor layers 210 are silicon added with the n-type impurities such as phosphorus at high concentration. Note that the semiconductor layers 210 may be silicon added with the p-type impurities such as boron at low concentration. The silicon layers 211 are formed of, for example, silicon and function as the waveguide 23.

The signal wires 220 are connected to, via contacts 225 made of a material including metal, one semiconductor layers 210 disposed on both sides of the silicon layers 211 along the waveguide 23. The ground wires 221 are connected to the other semiconductor layers 210 via contacts 226 made of a material including metal. The EO polymers 26 are disposed in recesses surrounded by the insulating layers 53 and the silicon layers 211.

Structure Near the Pad 222

Figure 5:
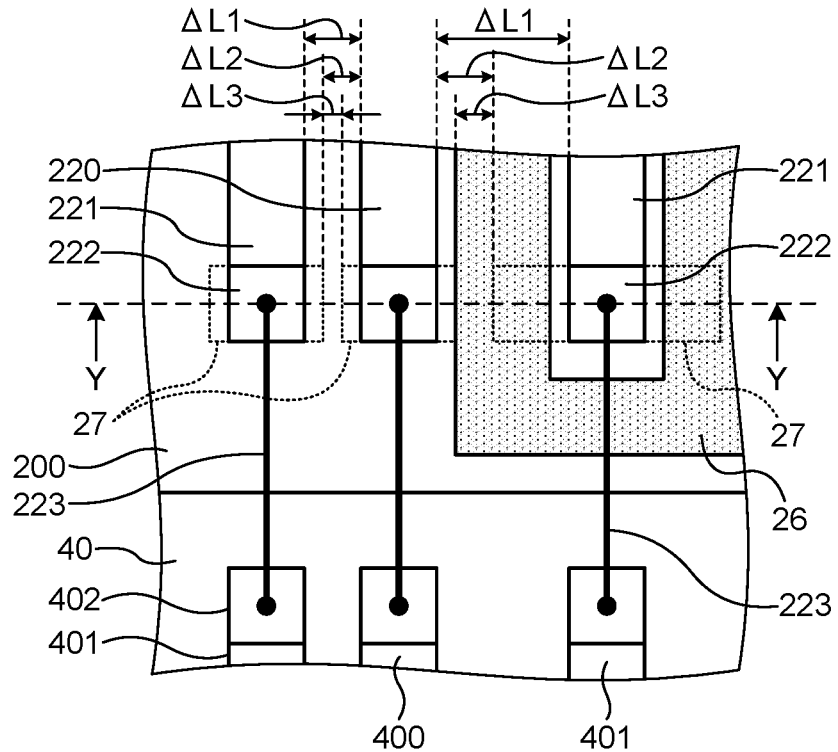
FIG. 5 is an enlarged view illustrating an example of a region A.
Figure 6:
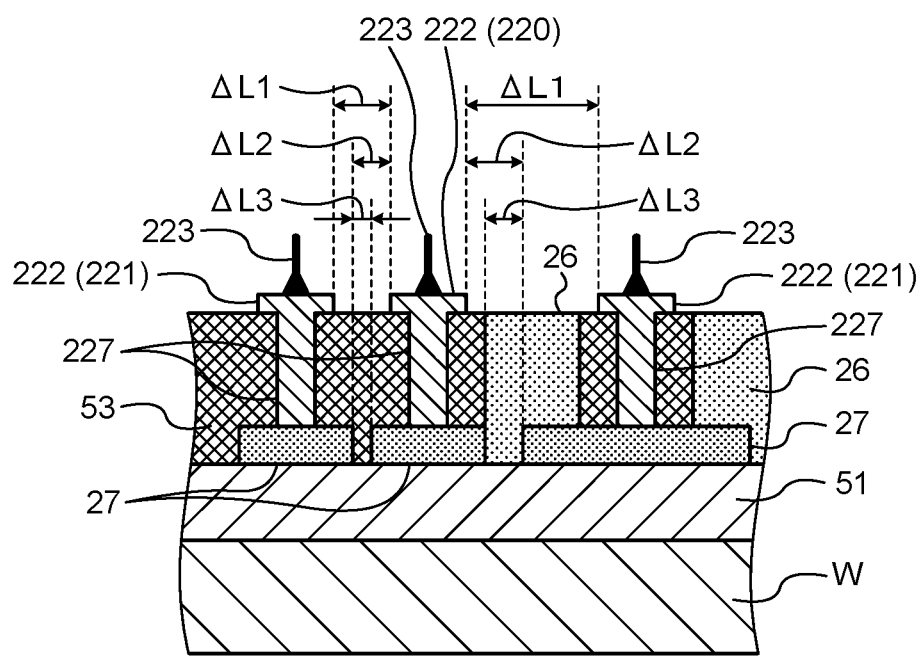
FIG. 6 is a Y-Y sectional view illustrating the example of the region A.

A region A of FIG. 2 is enlarged, for example, as illustrated in FIG. 5. FIG. 5 is an enlarged view illustrating an example of the region A. FIG. 6 is a Y-Y sectional view illustrating the example of the region A. A Y-Y section of FIG. 5 corresponds to FIG. 6. Two ground wires 221 are disposed on both sides of the signal wire 220. The EO polymer 26 is disposed between the signal wires 220 and one ground wire 221. Note that, in FIG. 5, from the viewpoint of clearness of the drawing, hatching is applied to the EO polymer 26.

The signal wires 220, the ground wires 221, and the EO polymers 26 are often disposed on the surface of the device main body 200 from the viewpoint of, for example, easiness of manufacturing. When the signal wires 220, the ground wires 221, and the EO polymers 26 are disposed on the surface of the device main body 200, the signal wires 220, the ground wires 221, and the EO polymers 26 are disposed not to cross. Accordingly, for example, as illustrated in FIG. 2 and FIG. 5, the EO polymers 26 are disposed between the signal wires 220 and the ground wires 221 and the end portions of the device main body 200. The distance between the pads 222 and the end portions of the device main body 200 is long. Consequently, wires connecting the pads 222 of the device main body 200 and the pads 402 of the external substrate 40 are long. When the wires are long, induction components of the transmission line increase and the characteristic impedance of the transmission line increases. When the characteristic impedance of the transmission line increases, reflection of an electric signal due to mismatch of the characteristic impedance occurs. When the reflection of the electric signal occurs, the intensity of a signal having a part of frequencies corresponding to a reflected wave in a signal band fluctuates and the quality of the signal is deteriorated.

Therefore, in this embodiment, the silicon wires 27 connected to the pads 222 are provided respectively in the signal wires 220 and the ground wires 221. For example, as illustrated in FIG. 6, the silicon wires 27 are connected to the pads 222 via vias 227 made of a material including metal.

In this embodiment, a distance $\Delta L2$ between the silicon wire 27 connected to the pad 222 of the ground wire 221 and the signal wire 220 is shorter than a distance $\Delta L1$ between the signal wire 220 and the ground wire 221, for example, as illustrated in FIG. 5 and FIG. 6. Consequently, in the transmission line near the pads 222, the capacitance components between the signal wires 220 and the ground wires 221 increase. The characteristic impedance of the transmission line near the pads 222 can be reduced. Consequently, the increase in the characteristic impedance of the transmission line near the pads 222 can be suppressed. The mismatch of the characteristic impedance can be suppressed. Consequently, the reflection of the electric signal can be reduced. The quality deterioration of the electric signal can be suppressed.

Note that, in the example illustrated in FIG. 5 and FIG. 6, a distance $\Delta L3$ between the silicon wire 27 connected to the pad 222 of the signal wire 220 and the silicon wire 27 connected to the pad 222 of the ground wire 221 is shorter than the distance $\Delta L1$ between the signal wire 220 and the ground wire 221. Consequently, the increase in the characteristic impedance of the transmission line near the pads 222 can be further suppressed. The reflection of the electric signal can be further reduced.

Figure 7:
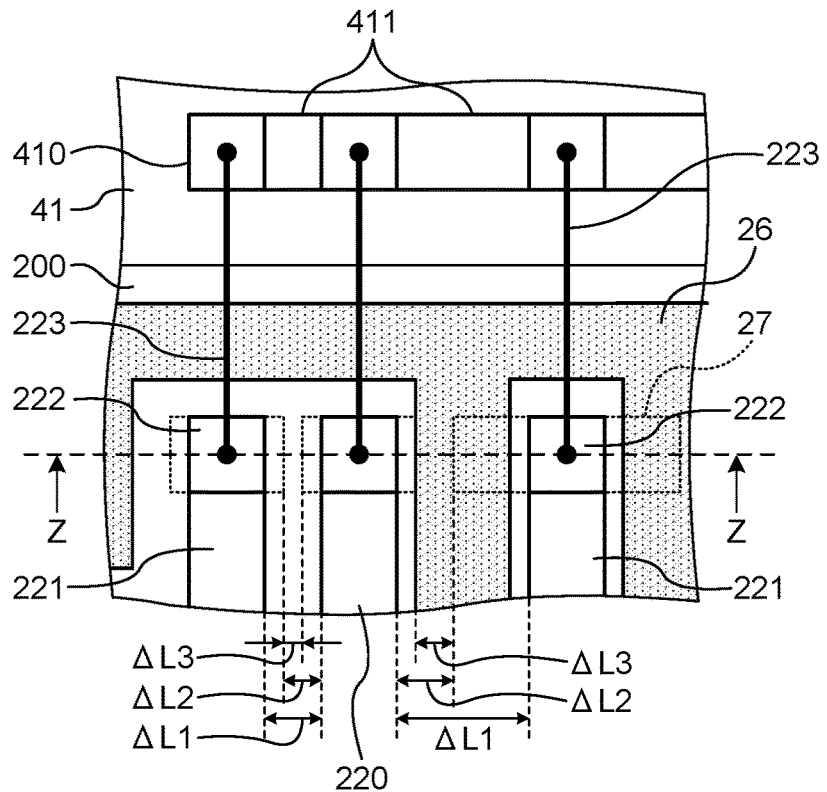
FIG. 7 is an enlarged view illustrating an example of a region B.
Figure 8:
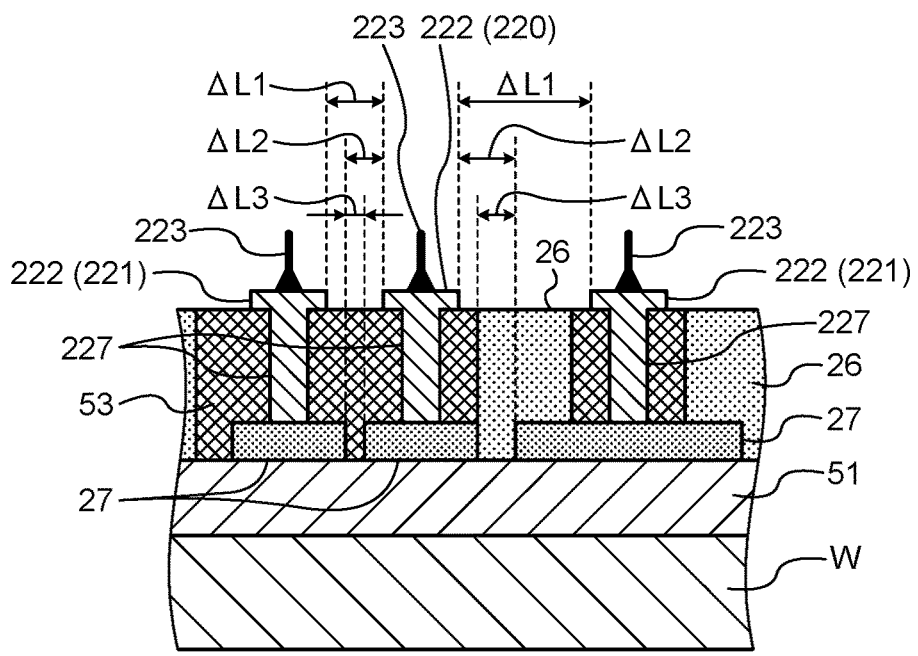
FIG. 8 is a Z-Z sectional view illustrating the example of the region B.

A region B of FIG. 2 is enlarged, for example, as illustrated in FIG. 7. FIG. 7 is an enlarged view illustrating an example of the region B. FIG. 8 is a Z-Z sectional view illustrating the example of the region B. A Z-Z section of FIG. 7 corresponds to FIG. 8. Note that, in FIG. 7, from the viewpoint of clearness of the drawing, hatching is applied to the EO polymer 26.

In the pads 222 connected to the terminal substrate 41 as well, the silicon wires 27 are provided, for example, as illustrated in FIG. 7 and FIG. 8. In FIG. 7 and FIG. 8 as well, the distance $\Delta L2$ between the silicon wire 27 connected to the pad 222 of the ground wire 221 and the signal wire 220 is shorter than the distance $\Delta L1$ between the signal wire 220 and the ground wire 221. Further, in FIG. 7 and FIG. 8 as well, the distance $\Delta L3$ between the silicon wire 27 connected to the pad 222 of the signal wire 220 and the silicon wire 27 connected to the pad 222 of the ground wire 221 is shorter than the distance $\Delta L1$. Consequently, on the pads 222 connected to the terminal substrate 41 as well, the reflection of the electric signal can be reduced. The quality deterioration of the electric signal can be suppressed.

Simulation Result

Figure 9:
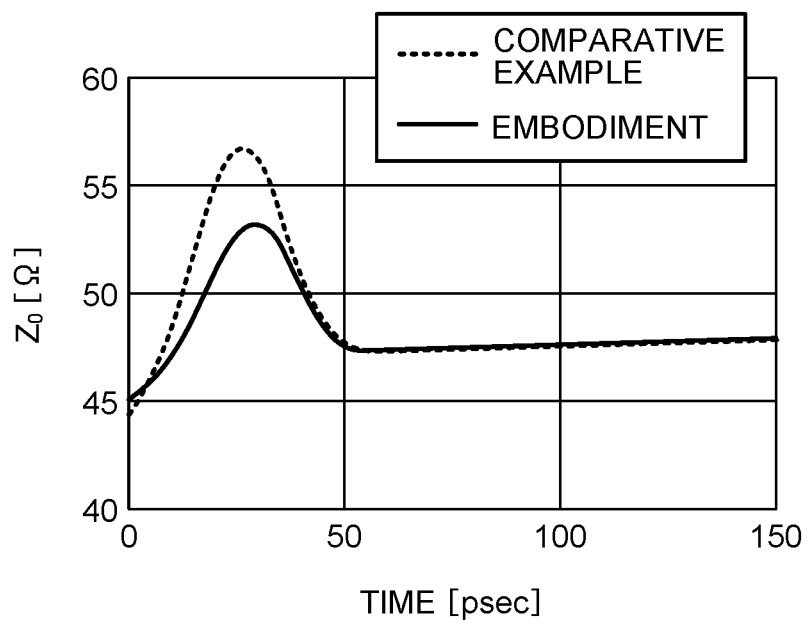
FIG. 9 is a diagram illustrating an example of a change in the characteristic impedance of a transmission line.

Next, a change in a characteristic impedance $Z_0$ of the transmission line in the case in which a stepwise electric signal is supplied is calculated by a simulation. FIG. 9 is a diagram illustrating an example of the change in the characteristic impedance $Z_0$ of the transmission line. In FIG. 9, a change in the characteristic impedance $Z_0$ of the transmission line in the case in which the silicon wires 27 are not provided on the pads 222 is illustrated as a comparative example.

As it is evident from FIG. 9, in the configuration of this embodiment in which the silicon wires 27 are provided on the pads 222, an increase in the characteristic impedance $Z_0$ of the transmission line is suppressed compared with the comparative example in which the silicon wires 27 are not provided on the pads 222. Therefore, in this embodiment, compared with the comparative example, mismatch of the characteristic impedance $Z_0$ of the transmission line can be suppressed. The quality deterioration of the electric signal can be suppressed.

Manufacturing Procedure for the Optical Transmission Device 20

Next, a manufacturing procedure for the optical transmission device 20 is explained with reference to FIG. 10 to FIG. 16. FIG. 10 to FIG. 16 are diagrams illustrating an example of a manufacturing process for the optical transmission device 20. In FIG. 10 to FIG. 16, a manufacturing process for the modulator 21 in the optical transmission device 20 is illustrated.

Figure 10:
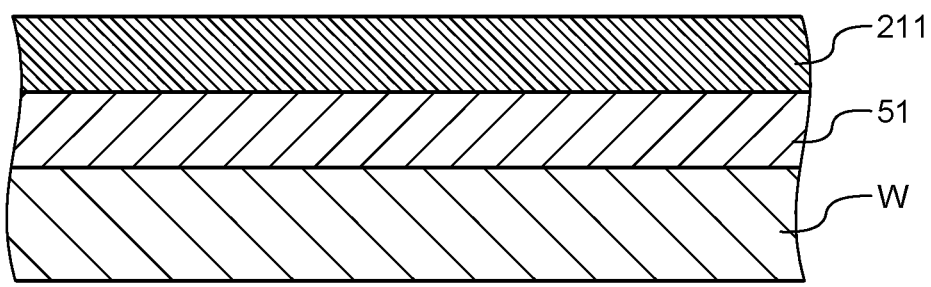
FIG. 10 is a diagram illustrating an example of a manufacturing process for the optical transmission device.
Figure 11:
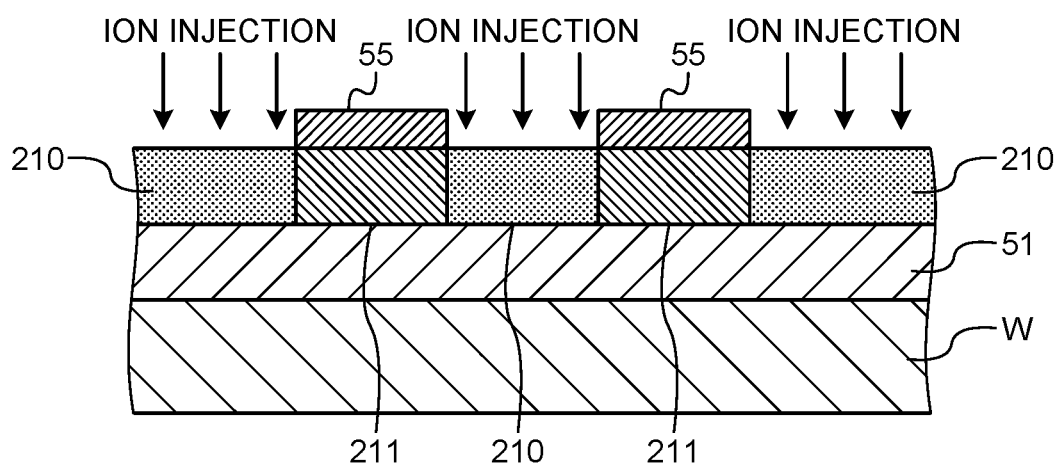
FIG. 11 is a diagram illustrating the example of the manufacturing process for the optical transmission device.

First, for example, as illustrated in FIG. 10, a BOX layer 51 is stacked on a substrate W and the silicon layer 211 is stacked on the BOX layer 51. A resist 55 is stacked on the silicon layer 211. The resist 55 is patterned such that regions where the semiconductor layers 210 are disposed are exposed. For example, as illustrated in FIG. 11, ions of the n-type impurities such as phosphorus are injected into regions of the silicon layer 211 not covered by the resist 55. Consequently, the semiconductor layers 210 added with the n-type impurities at high concentration is formed. The resist 55 is removed.

Note that, in the process illustrated in FIG. 11, the resist 55 is patterned such that regions where the silicon wires 27 are formed are also exposed. Consequently, the ions of the n-type impurities are also injected into the regions of the silicon layer 211 where the silicon wires 27 are formed. The silicon wires 27 added with the n-type impurities at high concentration are formed.

Figure 12:
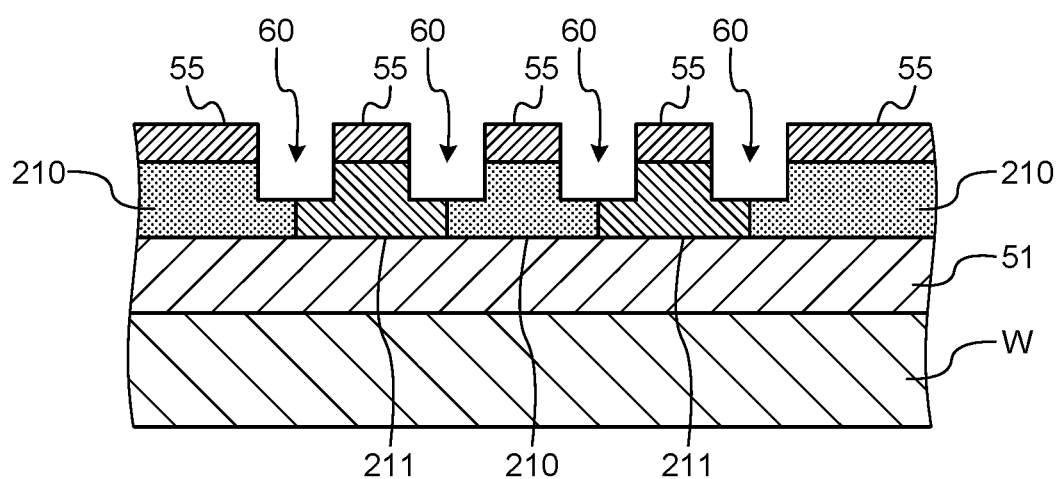
FIG. 12 is a diagram illustrating the example of the manufacturing process for the optical transmission device.

Subsequently, the resist 55 is stacked on the silicon layer 211 again. The resist 55 is patterned such that regions on both sides of portions of the silicon layers 211 to be formed as the waveguide 23 are exposed. For example, as illustrated in FIG. 12, regions of the semiconductor layers 210 and the silicon layers 211 not covered by the resist 55 are etched. Consequently, for example, as illustrated in FIG. 12, recesses 60 are formed along the portions of the silicon layers 211 to be formed as the waveguide 23. The resist 55 is removed.

Figure 13:
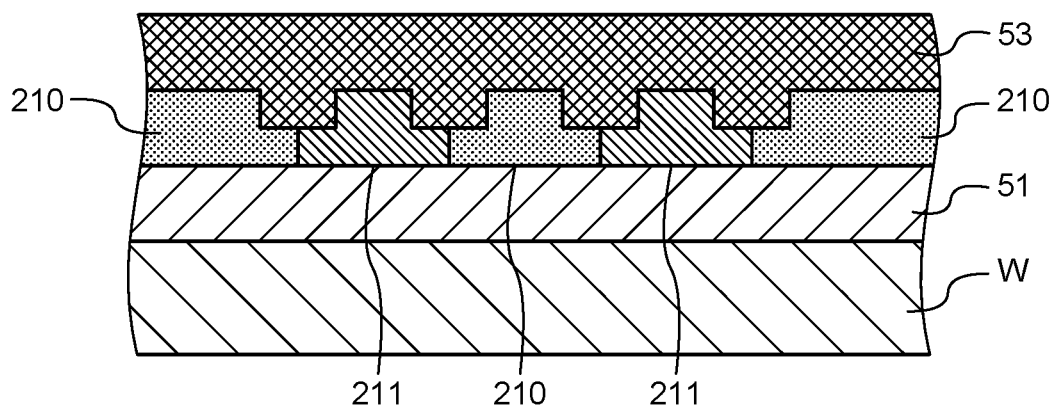
FIG. 13 is a diagram illustrating the example of the manufacturing process for the optical transmission device.
Figure 14:
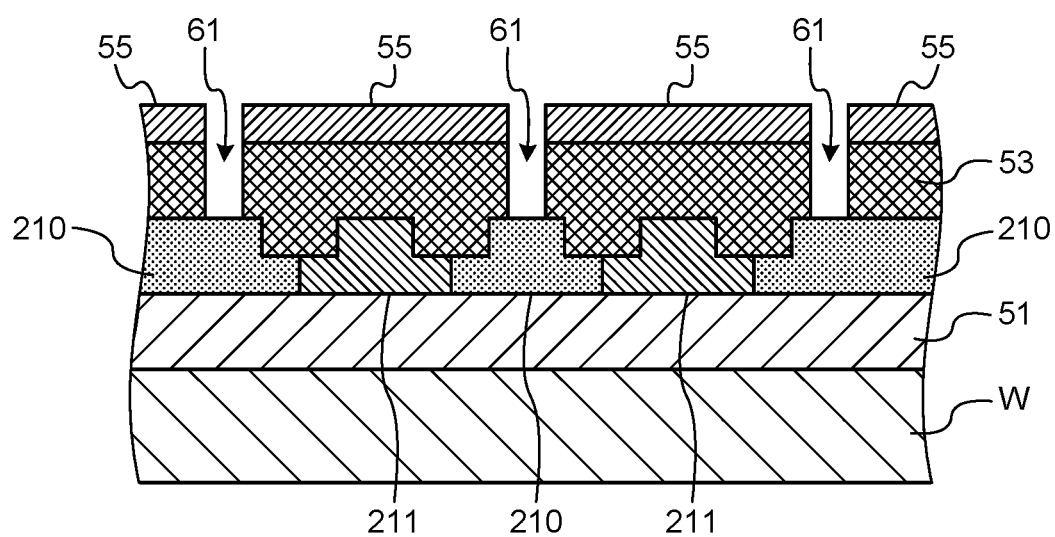
FIG. 14 is a diagram illustrating the example of the manufacturing process for the optical transmission device.

Subsequently, for example, as illustrated in FIG. 13, the insulating layer 53 is stacked to cover the semiconductor layers 210 and the silicon layers 211. The resist 55 is stacked on the insulating layer 53. The resist 55 is patterned such that regions where the contacts 225 and the contacts 226 are formed are exposed. Regions not covered by the resist 55 are etched, whereby, for example, as illustrated in FIG. 14, recesses 61 are formed in the insulating layers 53. The resist 55 is removed.

At this time, the resist 55 is patterned such that regions of the pads 222 where vias 227 are formed are also exposed. Regions not covered by the resist 55 are etched. Consequently, the recesses 61 are also formed in the insulating layers 53 in positions where the vias 227 are formed.

Figure 15:
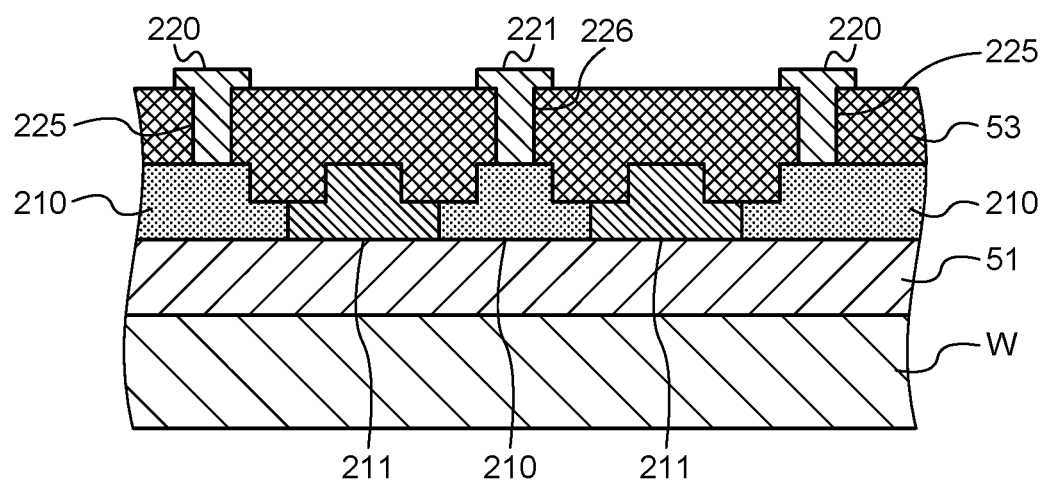
FIG. 15 is a diagram illustrating the example of the manufacturing process for the optical transmission device.

Subsequently, a wire material including metal is embedded in the recesses 61. The wire material is patterned. Consequently, for example, as illustrated in FIG. 15, the signal wires 220, the ground wires 221, the contacts 225, and the contacts 226 are formed.

At this time, the wire material including metal is also embedded in the recesses 61 formed in the positions of the vias 227. The wire material is patterned. Consequently, for example, as illustrated in FIG. 6 and FIG. 8, the pads 222 and the vias 227 are formed.

Figure 16:
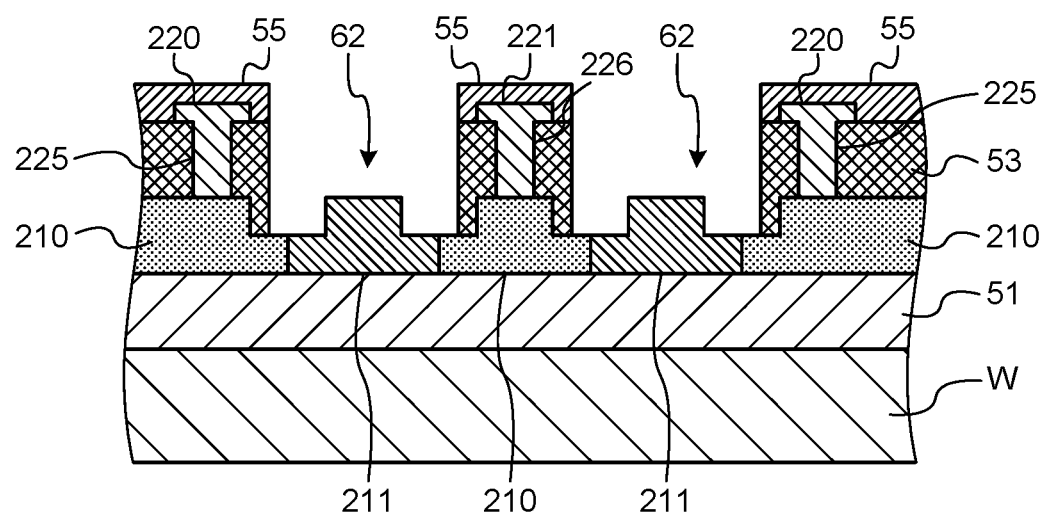
FIG. 16 is a diagram illustrating the example of the manufacturing process for the optical transmission device.

Subsequently, the resist 55 is stacked again. The resist 55 is patterned such that regions where the EO polymers 26 are disposed are exposed. Regions not covered by the resist 55 are etched, whereby, for example, as illustrated in FIG. 16, recesses 62 corresponding to the regions where the EO polymers 26 are disposed are formed. The resist 55 is removed. The EO polymers 26 are disposed in the recesses 62. Consequently, for example, the modulator 21 illustrated in FIG. 4 is formed.

Effects of the Embodiment

As it is evident from the above explanation, the optical transmission device 20 in this embodiment includes the substrate W, the waveguide 23, the signal wires 220, the ground wires 221, and the silicon wires 27. The waveguide 23 is provided on the substrate W and transmits an optical signal. The signal wires 220 and the ground wires 221 are disposed on the substrate W along the waveguide 23 and include, at the end portions, the pads 222 electrically connected to the external substrate 40 by the wires 223. The silicon wires 27 are connected to the end portions of the ground wires 221. The distance $\Delta L2$ between the signal wire 220 and the silicon wire 27 is shorter than the distance $\Delta L1$ between the signal wire 220 and the ground wire 221. Consequently, quality deterioration of a signal can be suppressed.

The optical transmission device 20 in the embodiment explained above further includes the silicon wires 27 connected to the end portions of the signal wires 220. The distance $\Delta L3$ between the silicon wire 27 connected to the ground wire 221 and the silicon wire 27 connected to the signal wire 220 is shorter than the distance $\Delta L1$ between the signal wire 220 and the ground wire 221. Consequently, the quality deterioration of a signal can be further suppressed.

The optical transmission device 20 in the embodiment explained above includes the modulator 21. The modulator 21 is connected to the signal wires 220 and the ground wires 221 and modulates, according to the electric signal supplied via the signal wires 220, an optical signal transmitted through the waveguide 23. Consequently, in the modulator 21, quality deterioration of a signal can be suppressed.

The modulator 21 in the embodiment explained above is an optical modulator in which the EO polymers 26 are used. The EO polymers 26 are disposed between the end portions of the signal wires 220 where the pads 222 are formed and the end portion of the substrate W and between the end portions of the ground wires 221 where the pads 222 are formed and the end portion of the substrate W. Consequently, in the modulator 21 in which the EO polymers 26 are used, quality deterioration of a signal can also be suppressed.

In the embodiment explained above, the n-type impurities are added to the silicon wires 27. Consequently, a resistance value of the silicon wires 27 can be reduced. Note that, in the embodiment explained above, p-type impurities may be added to the silicon wires 27 instead of the n-type impurities.

In the embodiment explained above, the semiconductor layers 210, which are silicon added with the n-type impurities, are provided along the waveguide 23 in the modulator 21. Consequently, in a process for manufacturing the modulator 21, the silicon wires 27 can also be formed. Therefore, the silicon wires 27 can be efficiently formed on the substrate W. Note that the semiconductor layers 210 of the modulator 21 may be silicon added with the p-type impurities.

Others

Note that the disclosed technique is not limited to the embodiments and various modifications are possible within the scope of the gist of the disclosed technique.

Figure 17:
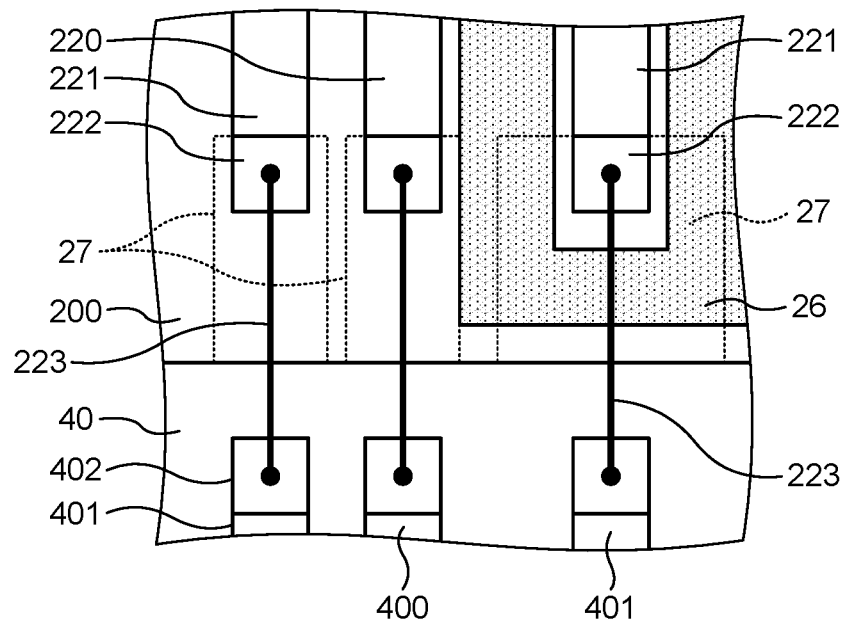
FIG. 17 is an enlarged view illustrating another example of the region A.

For example, in the embodiment explained above, the end portions of the signal wires 220 and the ground wires 221 and the silicon wires 27 provided at the end portions of the signal wires 220 and the ground wires 221 are disposed in positions separated from the end portion of the substrate W by a predetermined distance or more. However, positions where the silicon wires 27 are disposed are not limited to this. The distance between the silicon wire 27 and the end portion of the substrate W may be shorter than the distance between the end portions of the signal wire 220 and the ground wire 221 and the end portion of the substrate W. For example, as illustrated in FIG. 17, the silicon wires 27 may extend to the end portion of the substrate W. FIG. 17 is an enlarged view illustrating another example of the region A. Note that the region B may be configured the same.

Consequently, the capacitance components near the pads 222 can be further increased. Therefore, an increase in the characteristic impedance of the transmission line near the pads 222 can be further suppressed. Consequently, the mismatch of the characteristic impedance can be further suppressed. The reflection of an electric signal can be further reduced.

Note that a plurality of device main bodies 200 is formed on the substrate W. The plurality of device main bodies 200 is separated into individual device main bodies 200 by, for example, dicing using a laser beam. Accordingly, when a metal wire, through which the laser beam is not transmitted, and a dicing line cross, it is difficult to dice the substrate W using the laser beam. Accordingly, the signal wires 220 and the ground wires 221 are disposed in positions separated from the dicing line by a predetermined distance or more. On the other hand, the silicon wires 27 are formed by silicon that transmits the laser beam. Accordingly, even if the silicon wires 27 and the dicing line cross, the substrate W can be diced by the laser beam. Accordingly, the distance between the silicon wire 27 and the end portion of the substrate W can be set shorter than the distance between the signal wire 220 and the ground wire 221 and the end portion of the substrate W.

Figure 18:
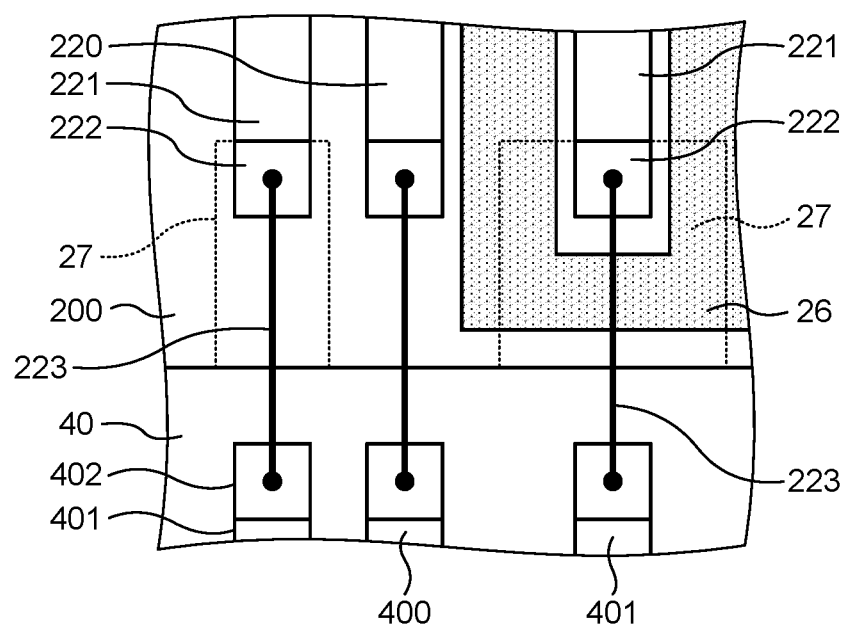
FIG. 18 is an enlarged view illustrating another example of the region A.

In the configuration illustrated in FIG. 17, when reflection of a signal is caused by the silicon wires 27 connected to the end portions of the signal wires 220, for example, as illustrated in FIG. 18, the silicon wires 27 do not have to be provided in the signal wires 220. FIG. 18 is an enlarged view illustrating another example of the region A. Note that the region B may be configured the same.

Figure 19:
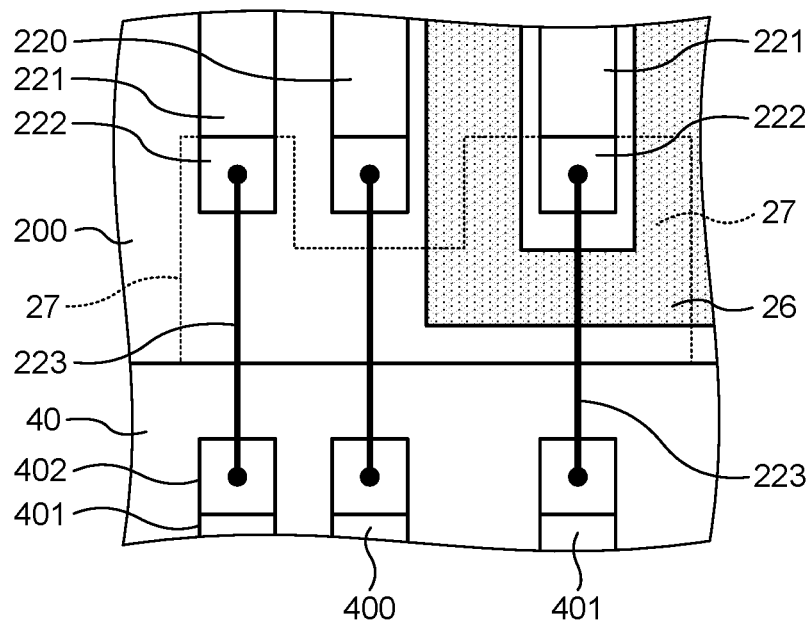
FIG. 19 is an enlarged view illustrating another example of the region A.

For example, as illustrated in FIG. 19, the pads 222 of a plurality of ground wires 221 may be connected by one silicon wire 27. FIG. 19 is an enlarged view illustrating another example of the region A. Note that the region B may be configured the same. Consequently, the capacitance components near the pads 222 can be further increased. Therefore, the reflection of an electric signal can be further reduced.

Figure 20:
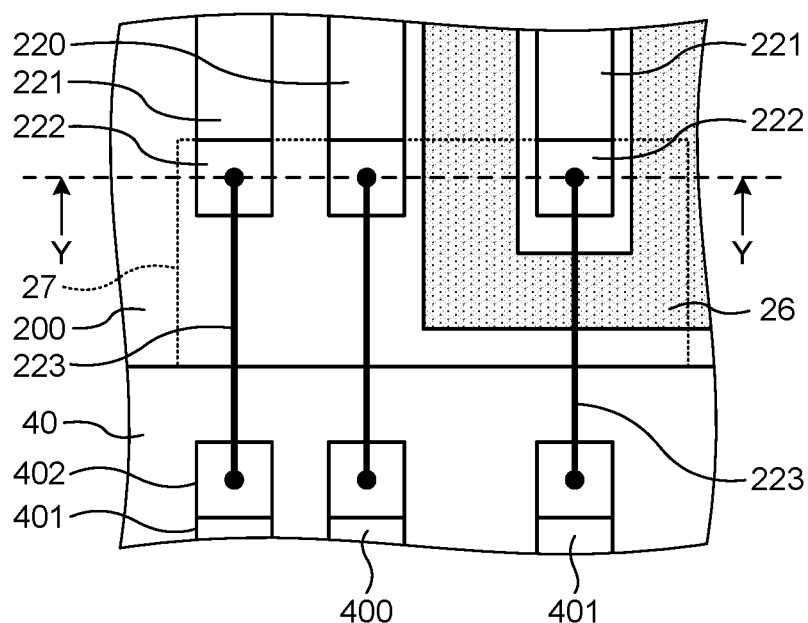
FIG. 20 is an enlarged view illustrating another example of the region A.
Figure 21:
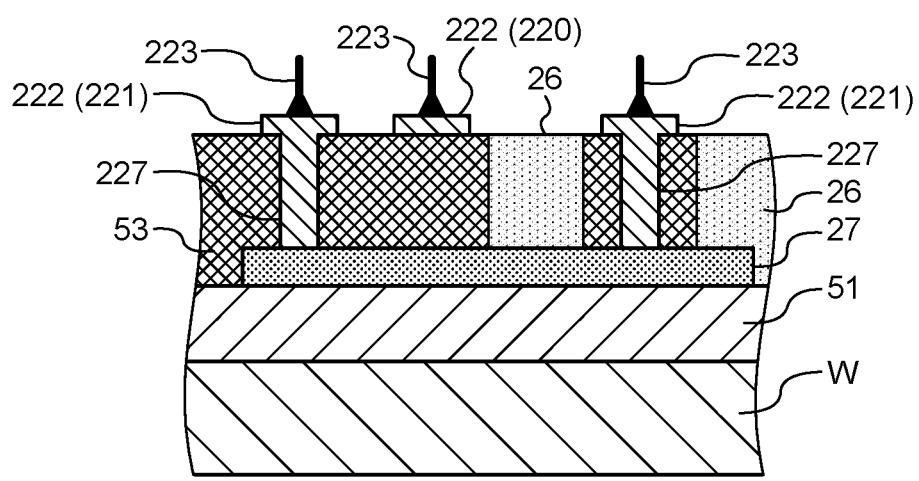
FIG. 21 is a Y-Y sectional view illustrating the other example of the region A.

The silicon wires 27 connected to the pads 222 of the plurality of ground wires 221 may be disposed in a lower layer of the signal wires 220, for example, as illustrated in FIG. 20 and FIG. 21. FIG. 20 is an enlarged view illustrating another example of the region A. FIG. 21 is a Y-Y sectional view illustrating the other example of the region A. Note that the region B may be configured the same.

In the embodiment explained above, the optical transmission device 20 including the modulator 21 in which the EO polymer is used is explained as an example. However, the disclosed technique is not limited to this. The disclosed technique can also be applied in, for example, the optical transmission device 20 including an optical modulator that applies a voltage to a PN junction portion provided in a silicon waveguide to thereby change the phase of an optical signal transmitted through the silicon waveguide.

In the embodiment explained above, the optical device is explained using the optical transmission device 20 as an example. However, the disclosed technique is not limited to this. The technique disclosed in the embodiment explained above can also be applied in, for example, the optical reception device 30.

According to an embodiment, it is possible to suppress quality deterioration of a signal.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical device comprising:
   a substrate;
   a waveguide provided on the substrate, the waveguide transmitting an optical signal;
   a signal wire and a ground wire disposed along the waveguide on the substrate and including, at an end of the signal wire and at an end portion of the ground wire, respectively, bonding portions electrically connected to an external device by wires; and
   a first stub wire connected to the end portion of the ground wire,
   wherein a distance between the signal wire and the first stub wire is shorter than a distance between the signal wire and the ground wire.

2. The optical device according to claim 1, wherein
   a plurality of the ground wires is provided on the substrate, and
   the first stub wire is formed in a lower layer of the ground wire and connected to the plurality of ground wires via vias.

3. The optical device according to claim 1, further comprising
   a second stub wire connected to the end portion of the signal wire, wherein
   a distance between the first stub wire and the second stub wire is shorter than a distance between the signal wire and the ground wire.

4. The optical device according to claim 1, further comprising an optical modulator connected to the signal wire and the ground wire, the optical modulator modulating, according to an electric signal supplied via the signal wire, the optical signal transmitted through the waveguide.

5. The optical device according to claim 4, wherein
   the optical modulator is an optical modulator in which an electro optic (EO) polymer is used, and
   the EO polymer is disposed between the end portion of the signal wire where the bonding portion is formed and an end portion of the substrate and between the end portion of the ground wire where the bonding portion is formed and the end portion of the substrate.

6. The optical device according to claim 4, wherein the first stub wire is a silicon wire obtained by adding n-type impurities to silicon.

7. The optical device according to claim 6, wherein a semiconductor layer is provided along the waveguide in the optical modulator, the semiconductor layer being the silicon added with the n-type impurities.

8. The optical device according to claim 4, wherein the first stub wire is a silicon wire obtained by adding p-type impurities to silicon.

9. The optical device according to claim 8, wherein a semiconductor layer is provided along the waveguide in the optical modulator, the semiconductor layer being the silicon added with the p-type impurities.

10. The optical device according to claim 1, wherein a distance between the first stub wire and the end portion of the substrate is shorter than a distance between the end portion of the ground wire and the end portion of the substrate.

\* \* \* \* \*